United States Patent

[11] 3,616,172

| [72] | Inventor | Louis C. Rubens |
| | | Midland, Mich. |
| [21] | Appl. No. | 792,500 |
| [22] | Filed | Jan. 21, 1969 |
| [45] | Patented | Oct. 26, 1971 |
| [73] | Assignee | The Dow Chemical Company |
| | | Midland, Mich. |

[54] FOAM COMPOSITES FOR FILLING ENCLOSED SPACES
5 Claims, 5 Drawing Figs.

[52] U.S. Cl. .................................................. 161/161,
  161/162, 260/2.5, 264/46
[51] Int. Cl. .................................................. B32b 5/16,
  B29d 27/00
[50] Field of Search .......................................... 264/45, 46;
  260/2.5 B; 161/160, 161, 162

[56] References Cited
UNITED STATES PATENTS

| 2,862,834 | 12/1958 | Hiler .............................. | 117/41 |
| 2,865,800 | 12/1958 | Stastny .......................... | 161/160 |
| 3,309,329 | 3/1967 | Schultz ........................... | 161/236 |

*Primary Examiner*—William J. Van Balen
*Attorneys*—Griswold and Burdick, Sidney J. Walker, Lloyd E. Hessenaur, Jr. and Richard G. Waterman ABSTRACT: Composites of plastic materials for filling enclosed spaces are prepared by coating the surface of a shaped core material with a layer of expandable resin particles plus a binder such as asphalt. The composite is then placed within the cavity to be filled and heated whereby the rest of the enclosed space is filled with the core material and the expanded particles and binder. The core material may comprise thermostable expandable cellular material. Alternately, the layer of expandable resin particles with the binder can be placed in enclosed spaces in the absence of the shaped core material and expanded to fill the void.

PATENTED OCT 26 1971  3,616,172

INVENTOR.
Louis C. Rubens
BY Sidney J Walker
ATTORNEY

FOAM COMPOSITES FOR FILLING ENCLOSED SPACES

This invention relates to a foam composite comprising a layer of highly viscous binder such as asphalt mixed with expandable resin particles which will expand to foams resistant to thermal collapse, which composite can be easily handled in sheet form to economically fill enclosed spaces. Such a composite can be sued to coat the surface of a shaped core material and then expanded whereby the expandable resin particles will expand and the binder adhere strongly to both the core and the retaining surface forming the enclosed space.

There are a number of processes for filling enclosed spaces such as the space between refrigerator walls with cellular materials to provide insulation. Liquid urethanes, for example, can be froth-foamed into such cavities. Also, molded foam inserts can be placed in position and bonded to the surface with suitable adhesives. The urethane system is complex due to equipment requirements for metering components and there are frequent problems with bridging, resulting in large void areas with no foam. The molded foam insert has a disadvantage that the molded foam must be of exact dimensions to permit bonding to all surfaces. Moreover, in these processes, where the enclosed spaces to be filled are subject to movement, such as in car doors, the filler has a tendency to become separated from the retaining walls and cause an annoying squeak.

This invention overcomes the limitations of the previous methods through the use of novel composites of plastic materials and novel methods for using these materials to fill such enclosed spaces. Where a shaped core is used, this invention allows the core to be only of approximate dimensions to the space to be filled and through the use of the binder insures strong adherence to both the core and the retaining wall. Such a core may also be made of a thermostable expandable material.

An object of the present invention is to provide a foam composite of expandable resin particles which will expand to foams resistant to thermal collapse mixed with a solid or semisolid binder which can be easily and economically made into a layer for ease of handling and for the economically filling of enclosed spaces of many kinds. A further object of this invention is to use such a foam composite in conjunction with a core material to fill enclosed spaces for formed by retaining walls wherein expansion of the composite fills the space completely and insures adherence to the wall without bulging the walls outwardly. A further object of this invention is to provide such a foam composite to coat the surface of a shaped thermostable expandable material whereby an enclosed space may be economically filled and wherein the shaped thermostable cellular material need be only of approximate dimensions of the space to be filled. Another object is to provide novel methods of using foam composites to fill the enclosed space between walls of such articles as refrigerator doors and automobile doors. Other objects of the invention will appear in the following description and claims, reference being had to the accompanying drawings forming a part of the this specification.

Preferred embodiments of the invention are shown in the drawings wherein.

Figure 1:
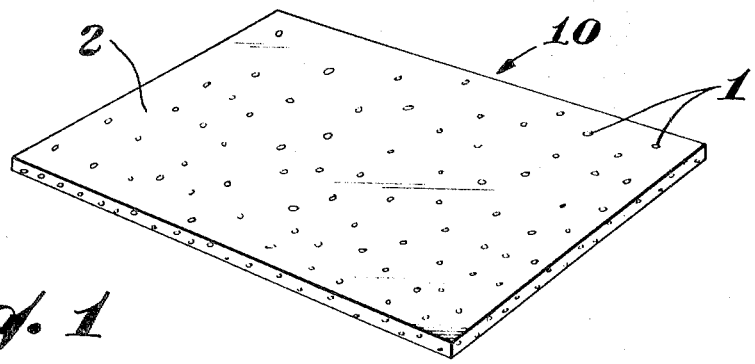
FIG. 1 is an exaggerated isometric view of a sheet of expandable resin particles mixed with a binder in accordance with the invention.

Looking now with more particularity at the drawings, FIG. 1 illustrates a layer or sheet of expandable resin particles mixed with a binder generally designated by the reference numeral 10. The layer or sheet comprises the expandable resin particle 1 embedded or substantially uniformly mixed with the binder 2.

Figure 2:
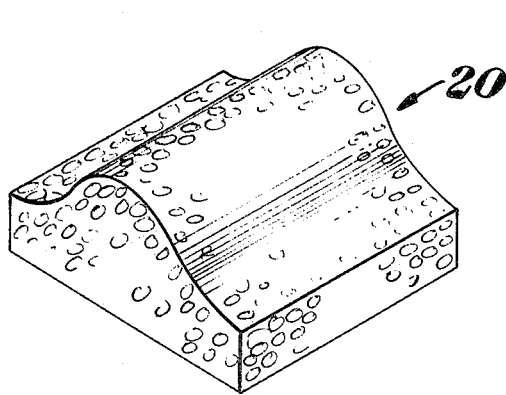
FIG. 2 is an isometric view of a shaped thermostable cellular core.

FIG. 2 illustrates a shaped thermostable cellular material in the form of a core generally designated by the reference numeral 20. This core approximates the dimensions of the cavity to be filled.

Figure 3:
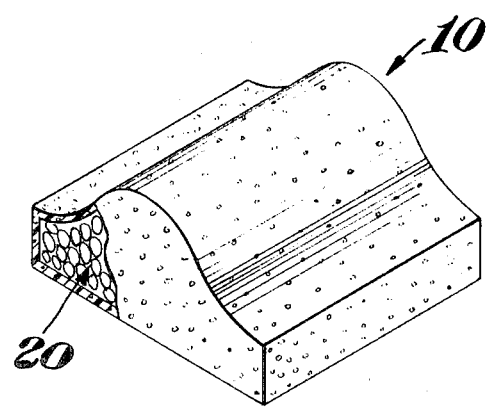
FIG. 3 is an isometric view partly in section showing the shaped cellular core of FIG. 2 after it has been coated with the expandable particle composite.

FIG. 3 illustrates the shaped cellular core of FIG. 2 after it has been coated with the expandable particle composite 10.

Figure 4:
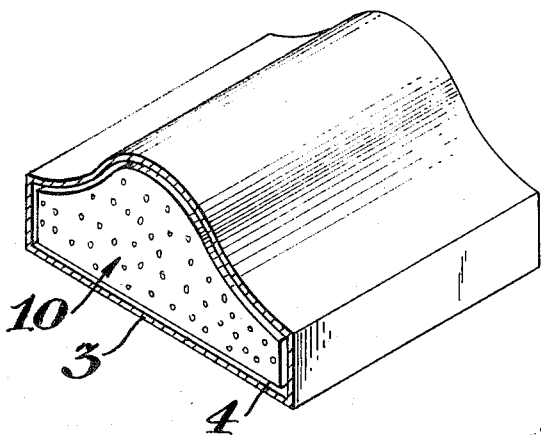
FIG. 4 is an isometric view partly in section of the coated cellular core placed within retaining walls.

FIG. 4 illustrates the coated core of Figure 3 placed within a mold or retaining walls whose dimensions the core 10 approximates. The retaining wall or mold 3 is slightly larger than the coated core 10 as shown by the spacing 4.

Figure 5:
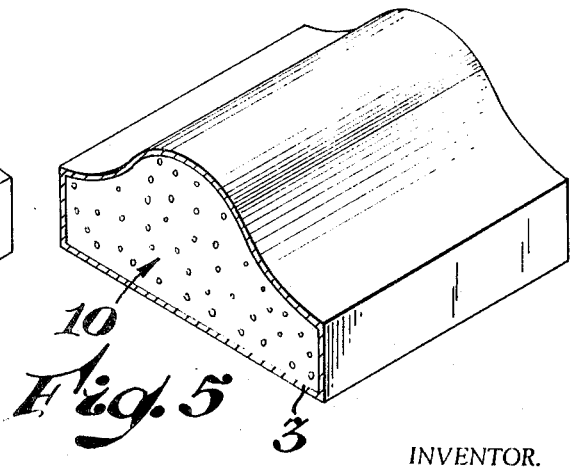
FIG. 5 is a view identical to that of Figure 4 after heat has been applied.

FIG. 5 illustrates how the remaining space formed by the retaining wall or mold 3 is completely filled by the expansion of the expanded particles of composite 10 after the application of heat.

It is necessary that the coating applied to the core contain expandable resin particles which will expand the foams resistant to thermocollapse at applied temperatures. For example, where it is desired to use the present invention in the filling of the spaces in automobile doors, refrigerator doors, and the like, lightly cross-linked polystyrene or polychlorostyrene beads containing volatile organic-blowing agents may be used advantageously.

The binders employed must not contain solvents for the beads or for the cellular core. Aqueous emulsions of asphalts or rubber modified asphalts among others can perform very well. The coating may be applied by simply mixing expandable particles with the binder emulsion and dipping or brushing onto the core. In such a case, it is desirable to permit the aqueous phase to evaporate before the final molding. Alternatively, where the expandable particle composite 10 is made into a layer or sheet as shown in FIG. 1, it can be simply placed over and shaped onto the core. Moreover, the expandable bead-binder layer 10 can also be applied by doctoring it onto a thin plastic film such as an ethylene-acrylic acid copolymer, and the coated film then inverted over the core where it will drape to the core configuration.

Unlike other processes for filling cavities with foams by foaming-in-place methods, expansion of only a relatively thin layer of material is required in the this case to obtain the final product. The steam probe method of expanding a large amount of expandable beads in such a cavity leads to excessive pressures which are incompatible where the retaining walls are thin such as automobile doors, refrigerator doors, and the like. In accordance with the present invention, the expandable particle composite 10 becomes strongly bonded to the walls and the core through use of the binder during the actual expansion process without pushing the walls outwardly. Beneficially, the core material may be made of an extruded foam which is then shaped to the desired configuration. Such a foam must be resistant to thermocollapse during the heating cycle.

EXAMPLE 1

In accordance with the present invention, extruded polychlorostyrene foam having a density of 3.3 pounds per cubic foot (p.c.f.) was prepared in plank form by extrusion with trichlorotrifluoroethane blowing agent. A piece of this foam (4inches ×4inches ×five-eighth inches thick) was coated on one surface with a 1-millimeter thick layer of a mixture of 2 parts roofing ash asphalt (powdered) with one part expandable cross-linked particles of the following composition:

91.95 percent 70:30o-p-chlorostyrene
0.05 percent divinylbenzene
7.0 percent isopentane
1.0 percent Celogen OT (oxybisbenzenesulfonyl hydrazide)

The average particle size of the above composition was 0.5 millimeter in diameter. The foam was coated on its top surface with this composition and placed in a mold race (4¼ inches ×4¼ inches ×1inches thick). The top surface was covered with a 4¼ inches ×4¼ inches ×

0.028 inch sheet of steel. The assembly was placed in a 175° C. air oven for 5 minutes and then removed and cooled. The foam composite completely filled the mold cavity. The extruded foam core had final dimensions of about 4¼ inches ×4¼ inches ×0.75 inches thick. The layer of expandable beads plus asphalt was 4¼ inches ×4¼ inches × approximately ¼ inches thick. The beads has expanded at least six times their initial volume. The bead-asphalt layer adhered strongly to the 0.028 inches thick steel sheet.

EXAMPLE 2

A cylinder of rigid polyurethane foam having a density of 2 p.c.f. (3cm. ×2.8 cm. long) was coated with a one millimeter thickness of a mixture of emulsified asphalt modified with rubber (adhesive) containing 50 percent by weight of the expandable beads described in example 1, above, and placed in a copper mold cavity having internal dimensions of 3.4 cm. ×3.2 cm. long. The mold was placed in an oven and heated for 10 minutes at 190° C. Upon cooling, the mold was examined and found to be completely filled and the bead-asphalt layer was strongly adhered to the copper walls. The core retained its initial dimension while the beads had expanded to about four times their initial volume, while the asphalt had flowed uniformly along with such expansion to form a substantially homogeneous mixture of bead and asphalt.

EXAMPLE 3

A mixture of emulsified asphalt modified with rubber (adhesive) containing 50 percent by weight of the expandable beads described in examples 1 and 2 was spread onto a 1-mil thick film of ethylene-acrylic acid copolymer to give a 1 mm. thickness of the asphalt-bead composite. After 24 hours at room temperature to permit evaporation of the water phase, the coated film was wrapped in a single layer around a bar of phenolic foam having the dimensions of five-eighth inch × five-eighth inch × 10 inch long with the asphalt adhesive in direct contact with the phenolic. The bar was then placed in a thin walled metallic mold having interior dimensions of 1inch ×1inch ×10inch and the entire assembly was placed in a 175° C. air oven for 5 minutes and then removed and cooled. The composite of the expandable beads and asphalt completely filled the remaining space, the asphalt adhesive adhered strongly to the phenolic bar while the ethylene-acrylic acid copolymer film which melts at about 110° C. had permitted the beads to expand readily above this temperature and moreover, moreover, was strongly adhered to the metal walls.

As indicated, the core may be comprised of material that is capable of some additional expansion such as polychlorostyrene and polystyrene. Light cross-linking with divinylbenzene may be necessary to insure against thermocollapse during the heating cycle required to foam the bead-binder composite. When polystryene cores are used they should be prepared with low permeability blowing agents such as isobutane, or suitable saturated aliphatic or cyclic perchlorofluoro carbons. Such a foam may be used with bead layers that expand well at about 95°–100° C., i.e., lightly cross-linked polystyrene with volatile organic blowing agents. It is a basic requirement, of course, that the heating cycle must be completed before any collapse of the core occurs. A polystyrene foam core, for example, could not be used with the expandable chlorostyrene beads which require expansion temperatures above the thermocollapse temperature of polystyrene foam. It can be readily seen of course that there are many potential applications where the thermostability of polystyrene foam for use as a core is adequate. Other nonexpandable cores can be used in accordance with the present invention. For example, epoxy, urethane, urea formaldehyde, glass, ceramic, wood, foam metal, foamed cellulose acetate, and the like, can function with almost any expandable bead which yields thermostable foam.

Expandable resin particles or beads within the meaning of this invention means resin particles or beads comprised of a thermoplastic synthetic resinous material capable of expansion and exerting pressure upon the application of heat, at least during the entire time and within the temperature range required for the bead-binding layer to expand and flow and fill the particular cavity. Such expandable beads yielding thermostable foams can be made from styrene, styrene copolymers, chlorostyrenes, chlorostyrene copolymers, methylmethacrylate, and the like, with small amounts, i.e., 0.02–0.1 percent of difunctional monomers such as divinylbenzene, glycol dimethacrylate, and containing blowing agents such as low-boiling aliphatic hydrocarbons, chlorofluoro carbons, and the like. Minor amounts of other comonomers such as acrylic and methacrylic acids, citraconic anhydride, and the like, may be added to increase heat distortion, gain solubility characteristics, or the like.

The mastic binder for the bead layer may be asphalts, rubber-modified asphalts, polyvinyl acetate latex, styrene-butadiene copolymer latex, epoxy-modified asphalts and the like. The basic requirements for such a binder are that (1) the binder can be mixed with the expandable beads, (2) the binder does not solvate or otherwise destroy the foamability of the beads, (3) the binder melts or becomes sufficiently less viscous under foaming conditions to permit it to flow uniformly in the expanding bead layer, and (4) after the composite of beads and binder is foamed, it should be strongly adherent to any core used and, where desired, to the retaining wall as in the case of automobile doors, refrigerator walls, and the like. As indicated previously, adherence to metal can be enhanced with the use of an ethylene-acrylic acid copolymer film as a substrate for the expandable bead-binder composite. Where, however, adherence to the retaining wall surface is not required after foaming is complete, other plastic films may be used in place of the ethylene-acrylic acid copolymer film such as polystyrene, polyethylene, polypropylene, and the like.

The utility of the present invention for filling spaced in refrigerator doors, automobile doors, and the like, is outstanding. For example, the present invention may be beneficially practiced during the paint cycle of the automobile. A core substantially configured to the enclosed space of the the thin metallic walls of the doors can be coated or layered with the expandable bead-asphalt composite and inserted between the walls of the door prior to the painting cycle. The heat of the paint oven through which the automobile passes is about 175° C. and the time of cycle is about 17 minutes. During this cycle, the bead-binder composite will flow and expand, completely filling the remaining enclosed space and adhere strongly to the retaining walls and the core. Because excessive pressures are not generated, as with a steam probe, the walls of the doors are not bulged outwardly and thinner gauges of metal for such walls may be used than heretofore. Further, the filling of the enclosed space precludes the formation of water and undesirable chemicals within such walls and reduces rust formation. The asphalt insures adherence and a modulus gradient is obtained which is unattainable where low density foams are directly adhered to metal. The bead-binder composite is equally useful for more or less open spaces and for use in the absence of a core. For example, a bead-binder composite such as a rubber-modified asphalt and lightly cross-linked polystyrene expandable beads can be fabricated in sheet form for use in ground covers. Thus, such a composite may be placed in a road bed and heated whereby a road surface may be provided which has insulative qualities for protection against frost upheaval and the like. Such a bead-binder composite may be coated onto polyethylene films, paper, and the like or not, as desired, to give further protective quantities and aid in ease of handling. Moreover, the bead-binder composite may be laid over expanded polystyrene board of the type presently used for road insulation, to give an outstanding insulative ground cover which is economical as well.

The amount of overall expansion is, of course, dependent on the size of the void or cavity to be filled and the type of resin used, inter alia. Where a core is s used, the fact that it might be made of expandable material must also be taken into account. Care must be taken in this regard to avoid the pushing out of the retaining walls due to overexpansion. Another factor is that enough binder must be employed to insure adherence to the walls and/or core where desired. Accordingly, I have found that the binder should contain no more than 50 percent by weight of the expandable beads in any case to insure complete filling of the area desired to be filled without excesses and to insure good adhesion. Moreover, the binder should be flowable between 75° C. and 200° C.

There are many obvious ramifications of this concept and it must be understood that the examples given herein are illustrative rather than restrictive and that numerous modifications of the invention can be made without departing from it. For example, my invention is not limited to any particular expandable polymer, any particular binder or any particular core (where one is used), provided they are compatible within the meaning of my invention, i.e., so long as the expandable polymer (including any which may be present in a core) is capable of continuing expansion during the heating cycle and is compatible with the binder surrounding it and such core is thermostable, i.e., will not be unduly affected by the heat cycle, except if expandable, to be resistant to thermocollapse, they are within the ambit of my new and useful invention. The expandable polymer and the binder are compatible within the meaning of this invention when the binder can be mixed with the expandable polymer particles without solvating or otherwise destroying the foamability of the particles, and the binder becomes sufficiently less viscous under foaming conditions to permit it to flow uniformly in the expanding bead layer and of such a nature as to be strongly adherent after foaming of the composite.

What is claimed is:

1. A formed structure having opposed sheetlike walls, said walls having an inner forming surface defining a cavity, a cellular adherent composite tightly adhered to said inner forming surface, said composite comprising no more than 50 percent by weight of expanded particles of synthetic resinous material substantially uniformly dispersed in a mastic binder, said binder capable of flowing uniformly upon the application of between 75° C. and 200° C. heat, said resinous material being resistant to thermocollapse after expansion when heated, at least during the time and temperature required to flow said binder, said composite surrounding and adhered to a shaped core, said core substantially filling said cavity and substantially configured to said inner forming surface.

2. The formed structure as claimed in claim 1 wherein the synthetic resinous material comprises polymonochlorostyrene or polystyrene cross-linked with about 0.02 to 0.2 mole present of divinylbenzene.

3. The formed structure as claimed in claim 1 wherein the binder is a member of the group consisting of asphalt, rubber-modified asphalt, epoxy-modified asphalt, polyvinyl acetate latex, styrene-butadiene copolymer latex and epoxy resins.

4 The formed structure as in claim 1 wherein the core comprises polymonochlorostyrene, cross-linked polystyrene, cross-linked polychlorostyrene, phenolic foam or rigid urethane foam.

5. The formed structure as in claim 1 wherein the sheetlike walls comprise metal of at least 15 mils thickness.

* * * * *

PO-1050
(5/69)

UNITED STATES PATENT OFFICE
CERTIFICATE OF CORRECTION

Patent No. 3,616,172            Dated 26 October 1971

Inventor(s) Louis C. Rubens

It is certified that error appears in the above-identified patent and that said Letters Patent are hereby corrected as shown below:

In column 1, line 7, delete "sued" and insert -- used --; in line 42 delete "for".

In column 3, line 8, delete "has" and insert -- had --; in line 50 delete "moreover,".

In column 4, line 6, delete "bead-binding" and insert -- bead-binder --; in line 20 insert -- epoxy resins, -- between "latex," and "epoxy-modified"; in line 38 delete "spaced" and insert -- spaces --; in line 50 delete "and the" and insert -- and to the --; in line 69 delete "quantities" and insert -- qualities --.

In column 6, line 20, delete "present" and insert -- percent --.

Signed and sealed this 2nd day of May 1972.

(SEAL)
Attest:

EDWARD M. FLETCHER, JR.
Attesting Officer

ROBERT GOTTSCHALK
Commissioner of Patents